United States Patent
Agrawal

(10) Patent No.: US 10,380,722 B2
(45) Date of Patent: Aug. 13, 2019

(54) EDITING A GRAPHIC OBJECT IN A VECTOR REPRESENTATION TO IMPROVE CRISP PROPERTY IN RASTER REPRESENTATION

(71) Applicant: Adobe Inc., San Jose, CA (US)

(72) Inventor: Vivek Agrawal, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/797,328

(22) Filed: Oct. 30, 2017

(65) Prior Publication Data

US 2019/0130537 A1    May 2, 2019

(51) Int. Cl.
     *G06K 9/00*    (2006.01)
     *G06T 5/00*    (2006.01)
     *G06T 7/30*    (2017.01)
     *G06T 3/40*    (2006.01)

(52) U.S. Cl.
CPC ............... *G06T 5/003* (2013.01); *G06T 3/40* (2013.01); *G06T 7/30* (2017.01); *G06T 2200/24* (2013.01); *G06T 2210/12* (2013.01)

(58) Field of Classification Search
CPC ......... G06T 5/003; G06T 7/30; G06T 11/206; G06T 4/60; G06T 2207/10016; G06T 2200/24; G11B 27/28; G06K 9/00751; G06K 9/325; G06F 3/0484

See application file for complete search history.

(56) References Cited

U.S. PATENT DOCUMENTS

| | | | | | |
|---|---|---|---|---|---|
| 5,416,890 | A | * | 5/1995 | Beretta | G06F 3/04845 345/440 |
| 5,760,785 | A | * | 6/1998 | Barber | G01J 3/02 345/440 |
| 6,166,731 | A | * | 12/2000 | Duvall | G11B 27/031 715/723 |
| 9,483,878 | B2 | * | 11/2016 | Whited | G06T 19/20 |
| 9,737,717 | B2 | * | 8/2017 | Moffitt | A61N 1/36146 |
| 9,805,269 | B2 | * | 10/2017 | Shekhar | G06K 9/00751 |
| 9,830,299 | B2 | * | 11/2017 | Campney | G05B 19/0426 |
| 2003/0098862 | A1 | * | 5/2003 | Hunt | G06T 17/00 345/418 |
| 2004/0006424 | A1 | * | 1/2004 | Joyce | G01S 5/0027 701/408 |
| 2012/0078589 | A1 | * | 3/2012 | McDaniel | G06F 3/04815 703/1 |
| 2017/0132814 | A1 | * | 5/2017 | Liu | G06T 11/206 |
| 2018/0315169 | A1 | * | 11/2018 | Agrawal | G06T 5/003 |

* cited by examiner

*Primary Examiner* — Amir Alavi
(74) *Attorney, Agent, or Firm* — Kilpatrick Townsend & Stockton LLP

(57) ABSTRACT

Various embodiments describe correcting blurriness of a graphic object rendered on a display. In an example, a computer system generates the graphic object in a vector format and in a raster format. The graphic object has a shaped defined by internal and external lines. The computer system detects the blurriness of an internal line and determines an offset by which the internal line should be translated to eliminated the blurriness. The graphic object is translated on the pixel grid of the raster format by the offset. The computer system also detects the blurriness of an external line and determines an offset by which the external line should be scaled to eliminate the blurriness. The external line scaled by this offset while keeping the center of the graphic shape in its position.

20 Claims, 13 Drawing Sheets

EDITING A GRAPHIC OBJECT IN A VECTOR REPRESENTATION TO IMPROVE CRISP PROPERTY IN RASTER REPRESENTATION

TECHNICAL FIELD

The application relates to generating a graphic object having a particular shape, where the graphic object is defined in a vector format and a raster format. Operations associated with editing the shape of the object in the vector format are also available in the raster format, while blurriness of the shape is avoided or reduced in the raster format.

BACKGROUND

Graphic editing applications are popularly used to generate and edit graphic objects of different shapes. For example, a user operates a computing device that hosts a graphic editing application and provides input via a user interface. In response, the graphic editing application generates a shape, such as a rectangle, rounded rectangle, ellipse, polygon, line or any other shape. Based on additional user input, the graphic editing application further edits the shape such that to scale up or down, change the color, and perform other edit operations that update properties of the shape. Generally the shape is defined by a set of lines that gives a geometric representation to the graphic object (e.g., a rectangle is defined by four straight lines having four right angles).

Certain graphic editing applications generate and store a graphic object in a vector format (e.g., in a file with an .ai, .svg, or .eps extension) and support export of the graphic object in a raster format (e.g., in a file with a .jpg, .png, or .bmp extension). The export includes previewing, editing, and, optionally, storing the graphic object in the raster format. Relative to the raster format, the vector format allows easier and more user friendly editing of the properties of the graphic object's shape.

Exporting the object from the vector format to the raster format presents multiple technical challenges that relate to, among other things, the editing of the graphic object's shape. These challenges include liveness and blurriness of the shape.

More specifically, some graphic editing applications support the concept of live shapes. This concept allows re-edits to the shape at any point in time as long as the graphic object has a live shape. The re-editing typically relies on the more edit-friendly vector format. In this way, even after the graphic object has been exported to the raster format, the vector format of the shape can still be re-edited easily and in a user friendly manner.

To support this concept of live shapes, a graphic editing application associates the graphic object with the shape's type (e.g., rectangle, rounded rectangle, ellipse, polygon, line), shape-specific properties (e.g., side dimensions of a rectangle), and editing widgets applicable to the type and specific properties (e.g., a widget to divide the rectangle into two squares given the side dimensions).

Losing liveness means losing the re-editing capabilities (e.g., the division widget is no longer available). It can occur when, for instance, the edits to the shape break its geometry. Because the geometry is broken, the existing associations between the graphic object and the shape type, properties, and widgets become inapplicable. As an example, if the user changes the shape to a new shape, (e.g., from the supported rectangular shape to a random shape), the existing associations (which would allow dividing the rectangular shape in two square) are no longer applicable (e.g., because the two squares could not be generated from the random shape) and the liveness of the graphic object is lost.

Blurriness relates to how well the graphic object will appear in the raster format. Generally, the raster format uses a pixel grid. The graphic object appears blurry when the export misaligns the shape on the pixel grid. More specifically, if a line of the shape is misaligned, the pixels of that line have properties (e.g., color) that differ from the corresponding vector format properties (e.g., a gray color when the vector format color is black). To correct the bluriness and achieve a crisp shape, the graphic editing application allows re-alignment of blurred lines.

Although existing graphic editing applications can support both the live shape concept and the bluriness correction, any re-alignment generally results in loss of liveness. In particular, the geometry of the shape is broken when a particular line is re-aligned. Because the geometry is broken, the liveness of the graphic object is lost. In turn, because the liveness is lost, the re-editing capabilities, including any editing widgets, are no longer available.

SUMMARY

Various embodiments describe correcting blurriness of a graphic object rendered on a display. In an example, a computer system generates a graphic object by defining a vector format and a raster format for the graphic object. The computer system detects that an internal line of the graphic object has a blurriness when rendered in the raster format. The raster format identifies a first location of the internal line on a pixel grid. The blurriness is associated with a first pixel distribution of the internal line at the first location on the pixel grid. The computer system reduces the blurriness of the internal line by at least computing a first offset between the first location and a second location on the pixel grid and translating the graphic object on the pixel grid by the first offset. The second location corresponds to a second pixel distribution of the internal line on the pixel grid. The computer system computes a second offset between an external line of the graphic object at a translated location and a third location on the pixel grid. The second offset is computed based on a blurriness of the external line. The computer system scales the graphic object by the second offset based on the vector format.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
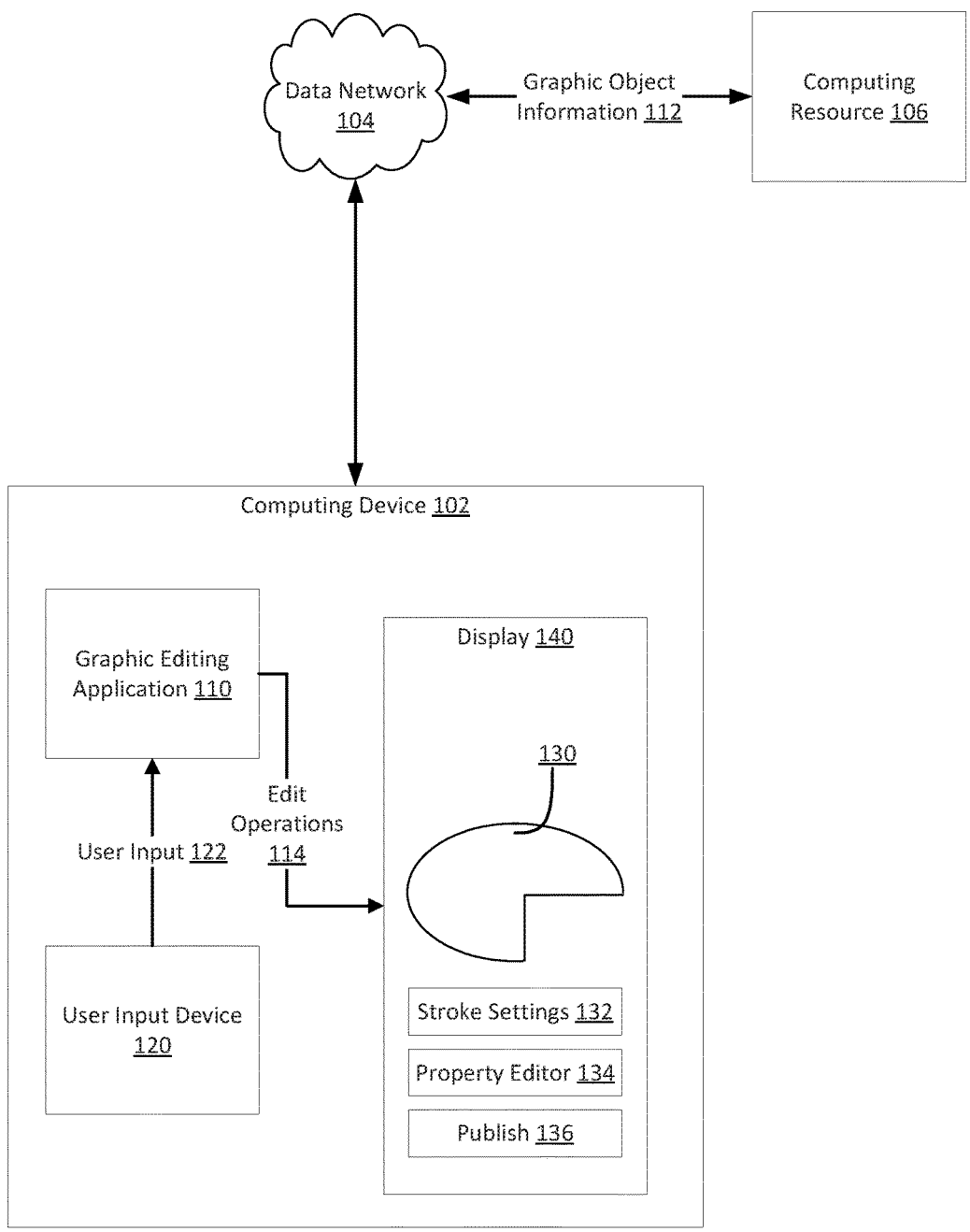
FIG. 1 illustrates an example of a computing environment for generating and editing graphic objects having shapes, according to certain embodiments of the present disclosure.

Embodiments of the present disclosure are directed to, among other things, a graphic editing application that supports vector and raster formats, the concept of liveness, and the blurriness correction of graphic objects. Unlike existing graphic editing applications, the embodiments maintain the liveness of a graphic object even after lines of the graphic object's shape have been re-aligned to avoid or eliminate blurriness. Generally, the graphic editing application re-aligns blurred lines of the shape without breaking the shape's geometry. In this way, the graphic object continues to have a live shape even after export to the raster format and subsequent blurriness correction. Accordingly, any user-friendly editing functionality available in the vector format can also be available after the export, thereby improving the process of editing the graphic object in the raster format while also rendering the graphic object crisp in this format.

To avoid breaking the geometry, the graphic editing application implements a phased approach in the blurriness correction. In a first phase, internal lines of the graphic object are analyzed to detect if any such line is misaligned to a pixel grid usable in the raster format. If an internal line is misaligned, an offset between a location of that line and a new location on the pixel grid is computed. No misalignment would exist at the new location, thereby the internal line becomes crisp. The graphic editing application translates the entire graphic object by the offset. In a second phase and after the graphic object has been translated, the graphic editing application determines if any of the external lines are misaligned to the pixel grid. If an external line is misaligned, an offset between a location of that line and a new location on the pixel grid is computed. No misalignment would exist at the new location, thereby the external line becomes crisp.

The graphic editing application scales the entire graphic object by the offset, for example, by symmetrically scaling up or down the graphic object around its center. Hence, throughout the two phases, the translation and scaling maintains and does not break the geometry of the shape, thereby conserving the liveness of the graphic object.

In an illustrative example, the graphic object has a pie shape. In particular, the graphic object is initially generated as an ellipse in a vector format. An editing widget allows replacement of an arching portion of the ellipse with two internal lines: a vertical line and a horizontal line, resulting in the pie shape. When rendered in the raster format, the pie shape includes the two internal lines at a right angle (e.g., the two internal lines are vertical and horizontal) and a top, relatively short horizontal line. This top line is an external line. In this example, the internal vertical line and the external horizontal line (the one on the top) are blurry in the raster format. Accordingly, in the first phase, the graphic editing application translates the entire object by a certain horizontal offset such that the internal vertical line becomes properly aligned on the pixel grid. Hence, at the end of this phase, the shape of the graphic object is still a pie and the liveness of the graphic object is maintained. Next, in the second phase, the graphic editing application determines that the external horizontal line remains blurry. Accordingly, the graphic editing application symmetrically scales up the entire object around the vertical and horizontal axes by the proper offset. Here also, the shape of the graphic object is still a pie and the liveness of the graphic object is maintained at the end of the second phase. Hence, the pie becomes crisp while also the liveness of the graphic object is preserved. Because the graphic object has a live shape even after the blurriness correction, the editing widget remains available. Accordingly, the editing widget can still be used in the raster format to, for example, change the pie shape back to an ellipse or modify the angle between the internal lines.

Accordingly, embodiments of the present disclosure provide many technical advantages over existing graphic editing applications. As opposed to losing the liveness of a graphic object when blurriness of its shape-defining lines are corrected, the liveness of graphic object's shape is retained. Hence, the editing functionalities defined based on the associations between the graphic object and the shape type, properties, and widgets survive the blurriness correction and are available. For example, if an existing content editing application allows a user to create a pie out of an ellipse based on an editing widget, the bluriness correction breaks the pie's geometry and would no longer present the editing widget as an option to further edit the pie. From that point on, the user has to manually, and very likely inaccurately, further edit the properties of the pie, where these edits would have been otherwise automatically and accurately available through the editing widget. In contrast, the graphic editing application implementing the embodiments of the present disclosure presents the editing widget after the bluriness correction, thereby improving the accuracy and the process of further editing the pie.

In the interest of clarity of explanation, embodiments of the present disclosure are described in connection with a graphic object that has a pie shape. This shape is generated based on an ellipse and is bounded by a bounding box applicable to both the pie and the ellipse. The pie shape has internal lines and external lines. The reference to "internal" indicates that a line is inside the bounding box. The reference to "external" indicates that a line is on or by the bounding box. However, the embodiments are not limited as such. Instead, the embodiments similarly apply to any other shape for which a bounding box can be defined and that can be presented with internal and external lines.

FIG. 1 illustrates an example of a computing environment for generating and editing graphic objects having shapes, according to certain embodiments of the present disclosure. As illustrated, the computing environment includes a computing device 102, a data network 104, and a computing resource 106. The computing device 102 hosts a graphic editing application 110 that is usable to generate and edit graphic objects. Example of the graphic editing application include Adobe Illustrator, available from Adobe Systems, San Jose, Calif. Information about the graphic objects (shown as graphic object information 112 in FIG. 1) is sent from the computing device 102 to the computing resource 106 over the data network 104. For example, the graphic object information 112 includes data that defines a graphic object such as its shape and properties of the shape, where the graphic object is generated by the graphic editing application 110. The graphic object information 112 is stored on the computing resource 106. The computing resource 106 provides to end user devices access to the graphic object over the data network 104 by transmitting the graphic object information 112 to these end user devices. Hence, the computing device 102 hosting the graphic editing application 110 acts a source for providing graphic objects and the computing resource 106 acts as a data store that distributes the graphic objects to end user devices.

In an illustrative example, a graphic object is usable as a menu icon on an end user device. In this example, an application developer uses the graphic editing application 110 to generate the menu icons for a particular application, where each icon has a particular shape. The menu icons and/or the application are published from the computing device 102 to the computing resource 106. The computing resource 106 acts as an application store from which the menu icons and/or the application are downloadable to end user devices.

Generally, the computing device 102 includes a processor and a memory that stores computer-readable instructions associated with the graphic editing application 110. When these instructions are executed by the processor, the graphic editing application 110 becomes operable to a user of the computing device 102. The user interacts with a user input device 120 of the computing device 102, such as with a touch screen, a keyboard, and/or a mouse, to provide user input 112 to the graphic editing application 110. The user input 112 defines properties of a graphic object 130 to be generated, such as the shape type, size, width of the lines of the shape, color of the lines, and other shape-specific properties. Based on the user input 112, the graphic editing application 110 generates and displays the graphic object 130 on a display 140 of the computing device 102. For instance, the user operates the user input device 120 to draw the shape of the graphic object 130 on the screen. Based on this user input 112, the graphic editing application generates and render the graphic object 130 according to the shape on the display 140.

The graphic editing application 110 also allows the user to edit properties of the graphic object 130. To do so, the graphic editing application 110 defines the graphic object 130 in a vector format and a raster format. The user can start with the vector format to generate the graphic object and then preview or store it in the raster format as further illustrated in FIG. 2. Edits can be performed in either formats. In an example, the graphic editing application 110 generates the graphic object 130 in the vector format, and a version of the graphic object 130 in the raster format is generated on demand. For instance, upon user input requesting a raster preview or an export of the graphic object 130 in the raster format, the graphic editing application 110 generates the raster format version of the graphic object 130.

In an example, the graphic editing application 110 presents menu options for the edits. The menu options can include, for instance, stroke settings 132 and property editor 134. The stroke settings 132 provide the options to set the width of the lines that define the shape of the graphic object 130, the color of the lines, and the relative alignment of the lines (the alignment is further described in connection with FIGS. 6-10). Other settings for a line that belongs to the graphic object 130 are also possible and can be part of the stroke settings 132 including line-cap, line-corner, dashed-line-or-not, arrowhead. Generally, stroke settings 132 are part of style settings that define the style, including the appearance, of the graphic object 130 and/or of lines that form this object 130. The style setting include, for instance raster effects, vector effects, fill, multi-fill, multi-stroke, and many other styles. These style settings can have impact on the blurriness and can be taken into account in the blurriness correction of the graphic object 130. Generally, correcting the blurriness involves shifting (e.g., translating and/or scaling) lines of the graphic object 130 such that, when presented on the pixel grid, these lines have the setting values as defined by the style settings. In a way, correcting the blurriness is about shifting the lines by certain offsets to meet the style settings. These offsets are computed between the current locations of the lines to new locations where these style settings are met. The property editor 134 provides the options to edit the graphic object 130 such as to set its size and change its shape type (e.g., from an ellipse to a pie). Generally, the property editor 134 is available as long as the graphic object 130 has a live shape. The stroke settings 132 may be available even after the liveness is lost.

Hence, the graphic editing application 110 receives user input 112 (or any additional user input received through the user input device 120) that invokes the stroke setting 132, the property editor 134. Based on this user input 112, the graphic editing application 110 performs edit operations 114 on the graphic object 130 and renders the edits on the display 140. The edit operations 114 include, for instance, changing the shape of the graphic object 130 (e.g., from an ellipse to a pie), changing the width, color, and/or alignment, of the shape's lines, changing the size and orientation of the graphic object 130 (and, equivalently, the lines), and either edits that affect the appearance of the graphic object 130 when rendered. The edit operations 114 can also include viewing (or previewing) the graphic object 130 in the vector format and/or the raster format.

The graphic editing application 110 also provides an option to publish 136 the graphic object 130. The option is presented on the display 140. Based on a user selection of the publish 136, the graphic editing application 110 can store the graphic object 130 locally on the computing device 102 and can transmit the graphic object 130 for storage on the computing resource 106 over the data network 104. The graphic object 130 is transmitted as the graphic object information 112. The storage of the graphic object 130, whether locally on the computing device 102 or remotely on the computing resource, can follow the vector format, the raster format, or both formats. For instance, the graphic object is stored as one or more files having .ai, .svg, or .eps extensions and/or .jpg, .png, or .bmp extensions.

Figure 2:
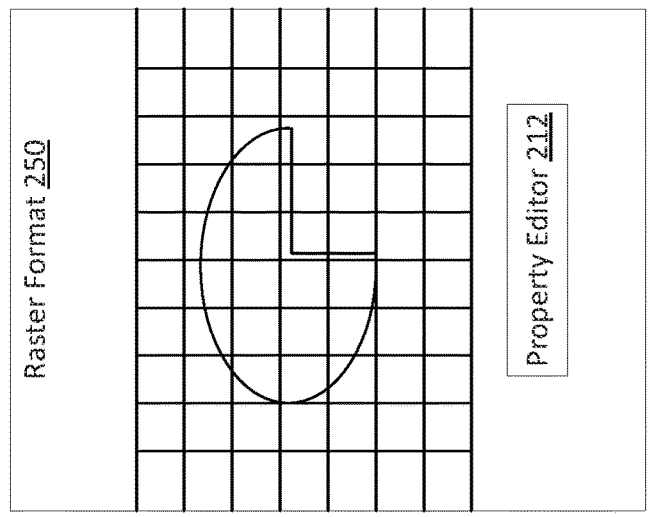
FIG. 2 illustrates an example of a vector format and of a raster format to define a graphic object, according to certain embodiments of the present disclosure.
Figure 2:
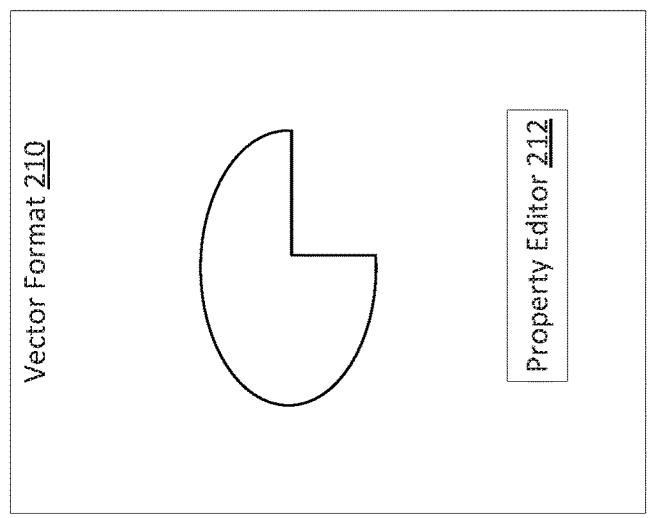

FIG. 2 illustrates an example of a vector format 210 and of a raster format 250 to define a graphic object, according to certain embodiments of the present disclosure. A graphic editing application, such as the graphic editing application 110, supports both formats 210 and 250. A user of the graphic editing application can generate the graphic object in any of the two formats 210 and 250 (e.g., first in the vector format 210) and can switch 220 to the other format (e.g., to the raster format 250). The format switching 220 can occur back and forth between the two formats 210 and 250.

In an example, the graphic editing application uses vector graphics to support the vector format 210. Vector graphics includes the use of polygons (or sets of mathematical functions (e.g., curves)) to render the graphic object. Vector graphics are based on vectors defined relative to control points or nodes. Each of the points has a definite position in a coordinate system (e.g., on the X and Y axes) of a work plane and determines the direction of the path of the vector. Each path may be assigned various attributes, including such values related to a stroke of the graphic object (e.g., of a line that defines a portion of the shape of this object), such as stroke color, shape, curve, width, and fill.

The graphic editing application also uses raster graphics to support the raster format 250. Raster graphics includes the use of a dot matrix data structure, representing a grid of pixels, or points of color. A raster can be characterized by the width and height of the image in pixels and by the number of bits per pixel or color depth, which determines the number of colors the pixel can represent.

In the vector format, a line of graphic object can be a vector or a portion of a vector. In the raster format, a line of graphic object can be a collection of pixels. The pixels forming a line can be adjacent to one another (two pixels are adjacent when they share a side or a corner).

Generally, when rendered on a display or printed on a medium, the vector format 210 provides a higher image quality resolution than the raster format 250. For example, the graphic object appears crispier (e.g., no blurriness) in the vector format 210. Further, the vector format 210 allows the graphic object to be scaled up or down without a loss to the quality resolution because the scaling is applied to the set of polygons as opposed to a pixel grid map.

Another advantage of the vector format 210 is that the shape of the graphic object is defined according to the set of polygons (e.g., the shape is refined with a geometric representation according to the set of polygons). Accordingly, a property editor 212 can be associated with the set of polygons and is usable to edit the shape (and, more generally, the graphic object) based on the set of polygons. The graphic object has a live shape because of this association and the liveness is maintained as a long as the geometry is not broken.

If the graphic object is generated in the vector format 210 and, subsequently, its format is switched to the raster format 250, the graphic object may become blurry, as further described in connection with the next figures. Also as further described in connection with the next figures, blurriness can be corrected in the raster format 250 without breaking the geometry of the shape. In other words, the blurriness can be reduced, if not eliminated, while also maintaining the definition of the graphic object according to the set of polygons. In this way, the property editor 212 is available for further edits of the graphic object according to the set of polygons even after the blurriness has been corrected. Further, the property editor 212 can be available in the raster format 250. Edits made to the graphic object in the raster format 210 based on the property editor 212 can be also reflected in the vector format 210. As such, if the property editor 212 provides a widget to change the shape of the graphic object (e.g., from a pie back to an ellipse, or from a pie with particular interior angles of its internal lines to another pie with different interior angle), that widget is available when the graphic object is rendered in the vector format 210 and in the raster format 250. The widget also remains available even after any blurriness in the raster format 250 has been corrected.

Figure 3:
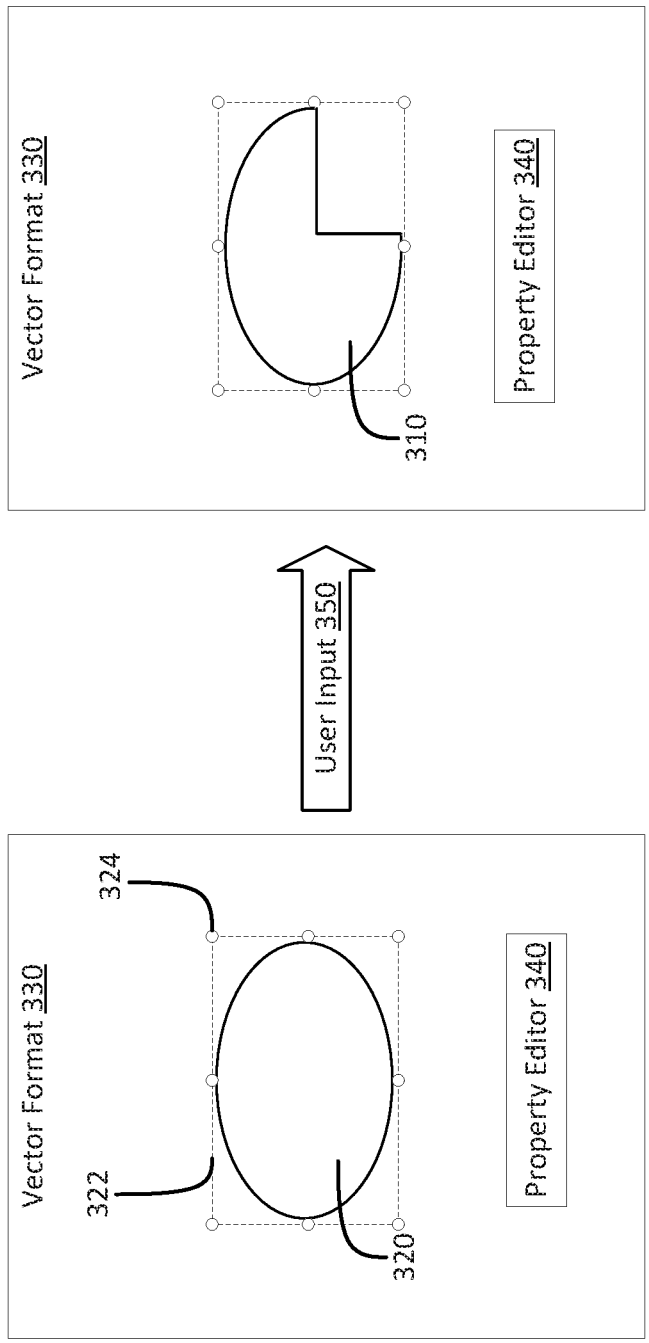
FIG. 3 illustrates an example of generating a graphic object having a pie shape based on an ellipse shape, according to certain embodiments of the present disclosure.

FIG. 3 illustrates an example of generating a graphic object having a pie shape 310 based on an ellipse shape 320, according to certain embodiments of the present disclosure. Although FIG. 3 illustrates this generating in a vector format 330, a raster format can be used instead if the underlying graphic editing application supports both formats and a property editor 340 that is associated with the definition of the graphic object in the vector format 330 (e.g., with the defining set of polygons).

In an example, generating the pie shape 310 starts with the ellipse shape 320. A bounding box 322 is defined around the ellipse shape 320 based on the lines of this ellipse. The lines are represented by the set of polygons that define the ellipse shape 320. The bounding box 322 includes option points 324. These option points 324 can be invoked based on user input 350 received in connection with the property editor 340. For example, the user input 350 can select option points 324 on the corner of the bounding box 322. In turn, an option in the property editor 340 is presented as a widget that allows a resizing of the ellipse. In response to the user input 350 defining a scaling factor (a scaling up or down factor depending on the resizing), the ellipse shape 320 is resized by applying this factor to the set of polygons, thereby resizing the ellipse shape 320. Further, the user input 350 can select option points 324 between the two corners (e.g., in the middle of a side of the bounding box 322). In turn, an option in the property editor 340 is presented as a widget that allows users to remove a portion of an external line and to replace the removed portion with internal lines intersecting inside the ellipse. By using this widget, the pie shape 310 is generated by updating the set of polygons to remove the portion and add a new set of polygons that defines the internal lines and their angle. Because the pie shape 310 is defined as a set of polygons (e.g., the remaining set associated with the ellipse shape 320 and the new set associated with the internal lines), the overall geometry of the graphic object is not broken. Instead, the graphic object has a live pie shape and the property editor 340 remains available to edit the pie shape 310.

Figure 4:
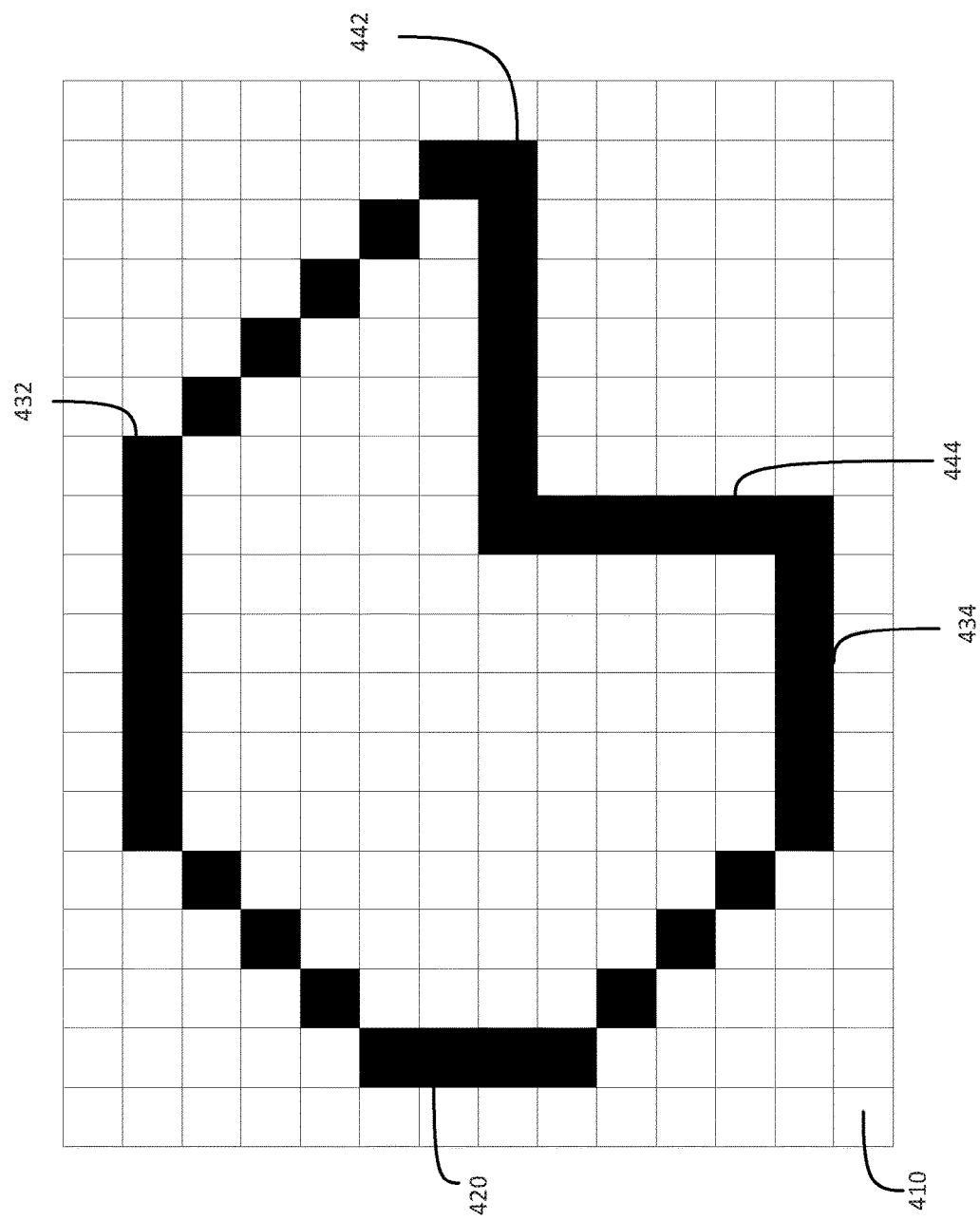
FIG. 4 illustrates an example of a pie shape of a graphic object presented in a raster format, according to certain embodiments of the present disclosure.

FIG. 4 illustrates an example of a pie shape of a graphic object presented in a raster format, according to certain embodiments of the present disclosure. As illustrated, the pie shape is crisp (e.g., has no blurriness) when rendered on a pixel grid 410. A description of a blurry pie shape, reasons for the blurriness, and techniques to correct the blurriness is further provided in connection with the next figures. Generally, the pie shape is defined by a set of lines. Each of the lines can be a segment or a vector that has a corresponding polygon-based definition in a vector format of the graphic object.

In an example, the set of lines includes external and internal lines. The external lines correspond to some or all the lines that were originally defined for the ellipse shape. Some of these lines fall on or are proximate to (e.g., are located within one pixel) the bounding box around the ellipse shape. In addition, some of these lines may be represented with a straight line geometry in at least the raster format. As illustrated in FIG. 4, the external lines include a left, vertical line 420, a top, horizontal line 432, and a bottom, horizontal line 434.

In comparison, the internal lines correspond to some or all the lines that were added to the modified ellipse shape to define the pie shape. These lines generally fall inside the bounding box and are, thus, referred to as internal lines. Depending on the interior angle formed by the internal lines, some or all these lines may be represented with a straight line geometry in at least the raster format. As illustrated in FIG. 4, the internal lines include a horizontal line 442 and a vertical line 444 that form an interior right angle. Of course other pie shapes are possible with other interior angles (e.g., an interior angle falling in a range of zero to three-hundred sixty degrees, where this range excludes zero and three-hundred sixty degree interior angles).

A line that belongs to the shape and that is defined by a vector or a segment (e.g., having a defining set of polygons) can have certain stroke settings, regardless of whether the line is external or internal. The stroke settings define, for example, the alignment, width, and color of the line. The alignment is further described in connection with the next figures. Briefly, the alignment specifies how the line should be positioned on the pixel grid 410 relative to coordinate points on that grid 410. The width defines how thick the line should be and can be expressed as a function of the number of pixels that the width of the line should occupy on the pixel grid (e.g., one pixel wide, two pixels wide, etc.). The color defines the color of each pixel that the line occupies on the pixel grid 410.

In the illustrative example of FIG. 4, each of the lines has a stroke width of one pixel, a black color, and an alignment that is centered relative to center points of the occupied pixels on the pixel grid 410. Of course other variations to the stroke settings are possible (e.g., different width, color, and alignment). Further, all the lines that form the pie shape can, but need not, have the same stroke settings. The pie shape of FIG. 4 is crisp because this shape is properly aligned on the pixel grid 410, where the proper alignment results in a proper pixel distribution of each line on that grid 410 (e.g., the width of each line is one pixel and each occupied pixel has a black color).

Figure 5:
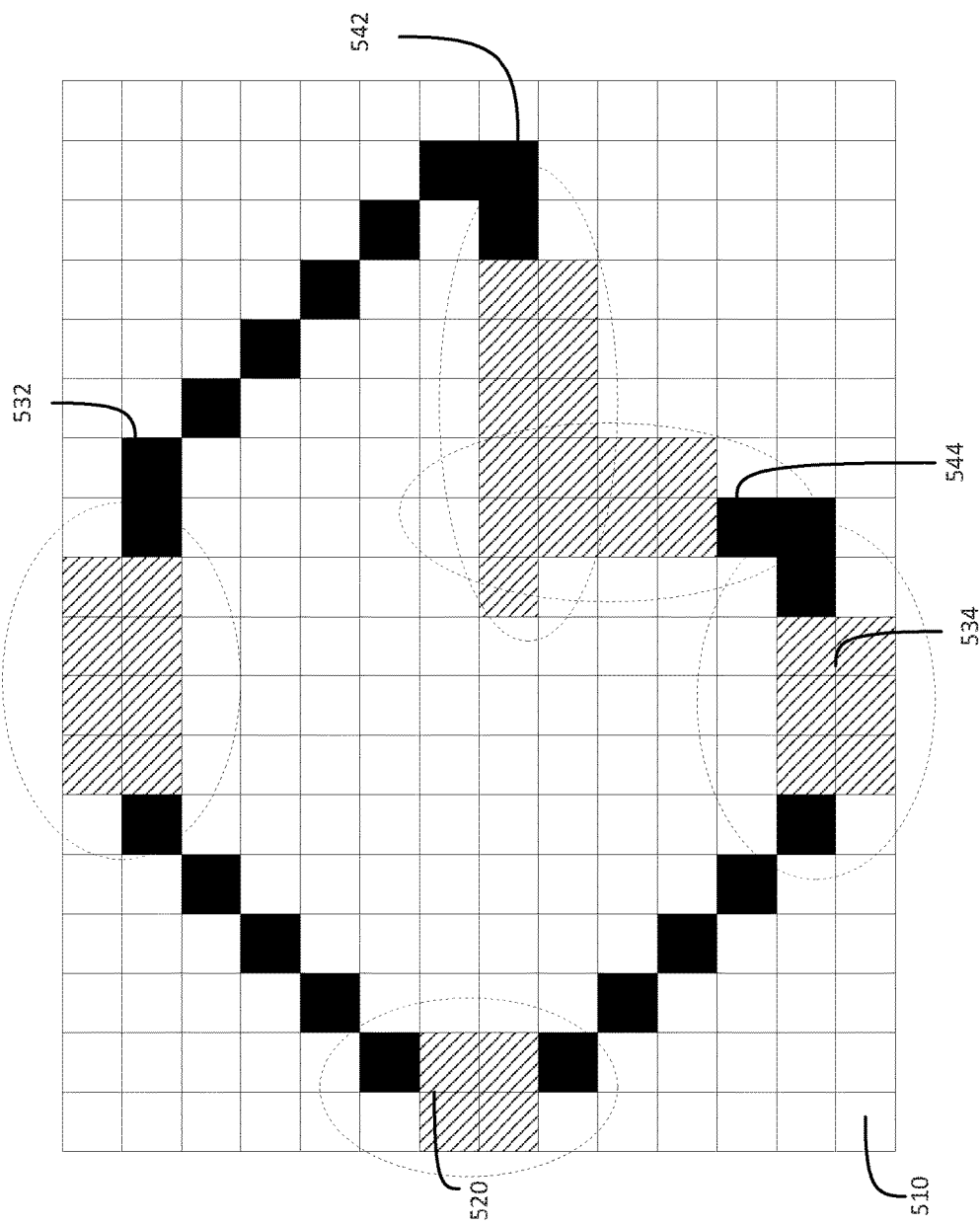
FIG. 5 illustrates an example of a blurry pie shape of a graphic object presented in a raster format, according to certain embodiments of the present disclosure.

FIG. 5 illustrates an example of a blurry pie shape of a graphic object presented in a raster format, according to certain embodiments of the present disclosure. Similarly to FIG. 4, here the pie shape has a left, vertical external line 520, a top, horizontal external line 532, and a bottom, horizontal external line 534. The pie shape also has a horizontal internal line 542 and a vertical internal line 544. However and unlike FIG. 4, here the pie shape has blurry lines when presented on a pixel grid 510. In particular, the lines 520, 532, 534, 542, and 544 are blurry because of their misalignment on the pixel grid 510. The misalignment is defined relative to coordinate points on the pixel grid and is further described in connection with the next figures.

Generally, the misalignment of a line results in a pixel distribution of that line on the pixel grid, where the pixel distribution does not match some or all of the stroke settings. For instance, a line formed by pixels is blurry when the pixels are misaligned on the pixel grid and the pixel misalignment results in the incorrect pixel distribution. In an example, the stroke settings define a one pixel width and a black color (or some other width and color values). However, due to the misalignment, the line is two pixels wide (or some width that is different from the user-defined width in the stroke settings). In turn, this width may necessitate a distribution of color across the occupied pixels, such that the color of each occupied pixel is gray instead of black (or some other color that is different from the user-defined color in the stroke settings).

As illustrated in FIG. 5, the blurriness of each of the lines 520, 532, 534, 542, and 544 is shown with a dotted ellipse. For crispness (as in FIG. 4), each of the lines 520, 532, 534, 542, and 544 should be one pixel wide, black, and centered relative to each occupied pixel. In other words, each of the lines 520, 532, 534, 542, and 544 would be crisp when rendered on the pixel grid if its pixel distribution is for a one pixel width with proper color (e.g., shown with solid black in FIG. 4) and alignment per pixel. However, each of the lines 520, 532, 534, 542, and 544 has a different pixel distribution and, thus, is not crisp. In particular, each of the lines 520, 532, 534, 542, and 544 have, at least in portions thereof, a two pixel width because of its misalignment, and the two pixel width results in a different color (e.g., gray shown with shaded lines in FIG. 5) in each of the occupied pixels.

Figure 6:
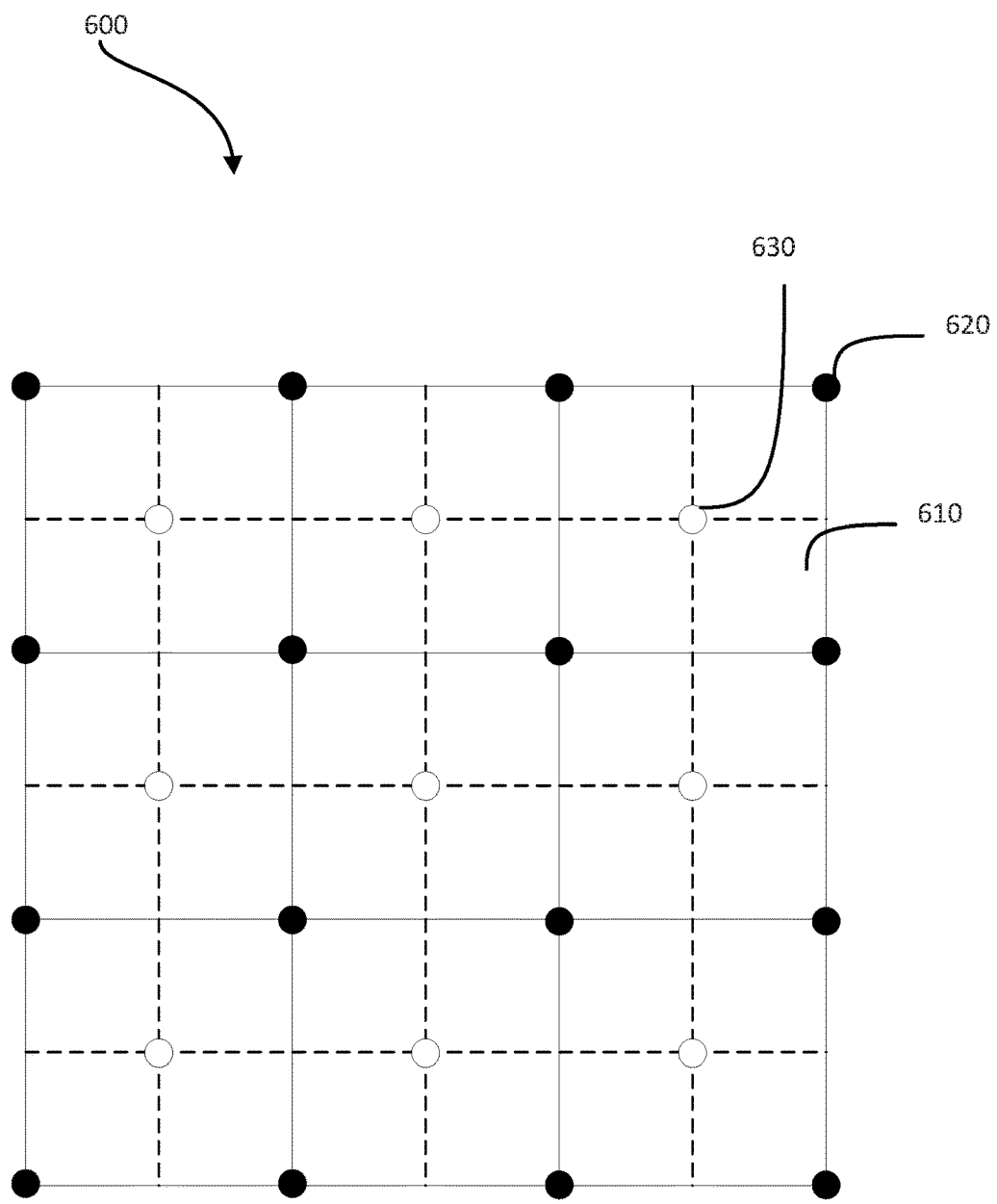
FIG. 6 illustrates an example of a pixel grid usable in a raster format, according to certain embodiments of the present disclosure.

FIG. 6 illustrates an example of a pixel grid 600 usable in a raster format, according to certain embodiments of the present disclosure. The pixel grid 600 is a grid of pixels 610 representing a coordinate system for placing a line of a graphic object. Each pixel 610 can be occupied by the line. And occupying a pixel 610 indicates that the line uses the pixel 610, where the properties of this pixel 610 (e.g., color) would be set according to the stroke settings of the line.

Each pixel 610 contains coordinate points that can be used for positioning the line through that pixel 610 (e.g., for the alignment). The coordinate points include, for example, corner points 620 on the corners of each pixel 610 and center points 630 in the center of each pixel 610. In a way, the center points 630 represent corner points on a sub-pixel grid.

The alignment of the line can be defined relative to the corner points 620 or the center points 630. In an example, aligning the line with a corner point 620 indicates that middle of the line should go through the corner point 620. In this way, if the line is one pixel wide and is aligned with a corner point 620, half of the line occupies the pixel 610 to which the corner point 620 belongs. In comparison, aligning the line with a center point 630 indicates that middle of the line should go through the center point 630. In this way, if the line is one pixel wide and is aligned with a center point 630, the line fully occupies the pixel 610 to which the center point 630 belongs. These and other alignments are further shown in FIGS. 7-10.

Generally, the stroke settings of the line include a setting that identifies whether the line should be aligned with a corner point of a pixel of the pixel grid or with a center point of the pixel. This stroke setting can be set based on user input received at the underlying graphic editing application. As described in connection with FIGS. 7-10, different stroke alignment types are possible based on the use of corner and center points, including an inside alignment (FIG. 7), an outside alignment (FIG. 8), a center alignment with an odd number of pixels (FIG. 9), and a center alignment with an even number of pixels (FIG. 10). In an example, the specific stroke alignment type is defined by the stroke settings. A stroke alignment indicates the direction in which stroke width should distribute relative to the line itself rather than the pixel-grid (e.g., inside alignment indicates that the stroke width should be inward to the line). Stroke can be distributed about a line towards inward/outward direction (inside/outside stroke-alignment) or both (center stroke-alignment).

Stroke alignment may not be the direct cause for blurriness. Instead, and as explained in connection with FIG. 5, pixel alignment can directly cause the blurriness. Pixel alignment indicates the placement of the line relative to the pixel-grid (e.g., relative to the corner points of the pixel grids). Correcting the blurriness depends on the pixel alignment. In turn, properly aligning the pixels takes into account the stroke alignment. For example, for inside and outside stroke alignments, the pixel alignment would be based on corner points of the pixel grid (e.g., the pixels of the line are properly aligned—the pixel alignment is proper and there is no blurriness—when each pixel has its corners aligned with corner points of the pixel grid). For center stroke alignment, the pixel alignment would be based on center points of the pixel grid (e.g., the pixels of the line are properly aligned when each pixel has its corners aligned with center points of the pixel grid). Hence, an offset is computed to properly align the pixels with the corner pixels or center pixels based on the stroke alignment. Once computed, the line is shifted (e.g., translated or scaled) by the offset to a new location on the pixel grid. Stroke alignment is used to properly distribute the stroke width at the new location.

In an example, a table can be used for shifting the line to correct blurriness. The table identifies rules for computing offsets to correct the pixel alignment, where the correction moves the line relative to corner points or center points of the pixel grid, and where the use of corner points or center points is based on the stroke setting (e.g., inside alignment, outside alignment, center alignment with an even number of pixels, and center alignment with an odd number of pixels). This table can be stored locally to the underlying graphic editing application and can be accessed and used by this application to compute the offsets for correcting the blurriness.

Figure 7:
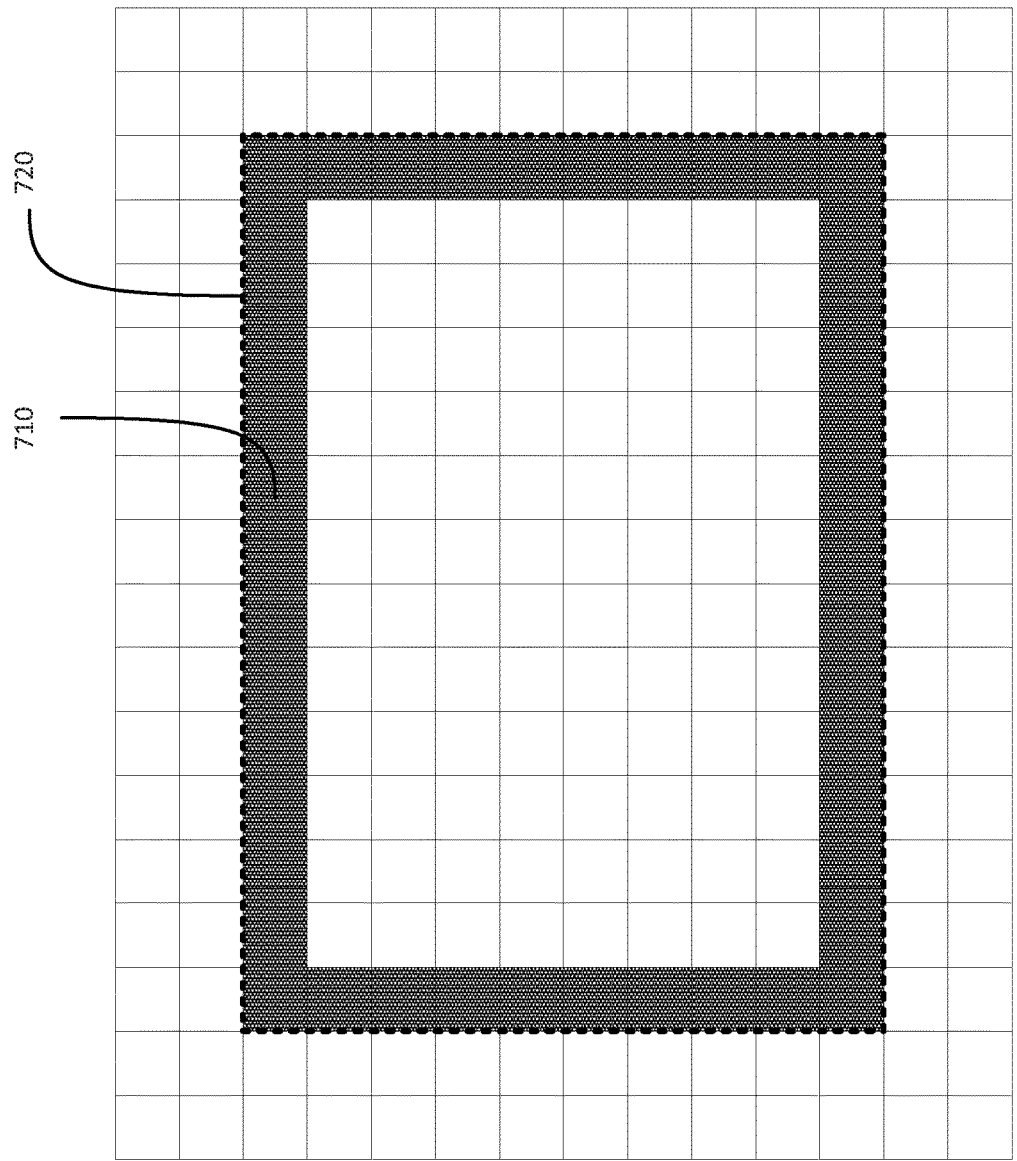
FIG. 7 illustrates an example of an inside alignment of a line relative to corner points of a pixel grid, according to certain embodiments of the present disclosure.

FIG. 7 illustrates an example of an inside alignment of a line 710 relative to corner points of a pixel grid, according to certain embodiments of the present disclosure. In an example, the corner points of the pixels to be occupied by the line 710 on the pixel grid form a perimeter 720 (shown as a dotted perimeter in FIG. 7). The stroke setting identifies that an outside edge of the line 710 should be aligned with each corner point belonging to the perimeter 720. In other words, the line 710 is bounded externally by the perimeter 720 (e.g., the line 710 is inside the perimeter 720 and its outside edge goes through the corner points that define the perimeter 720).

If the line 710 appears blurry and is set to have an inside alignment, pixel misalignment causes the blurriness and can be observed between the outside edge (e.g., the outside corners of each the pixels that form the line 710) and the corner points of the pixel grid. In this case, the line 710 can be shifted by up to half a pixel in a particular direction based on the pixel misalignment. At the new location, the line 710 is bounded externally by the perimeter 720.

Figure 8:
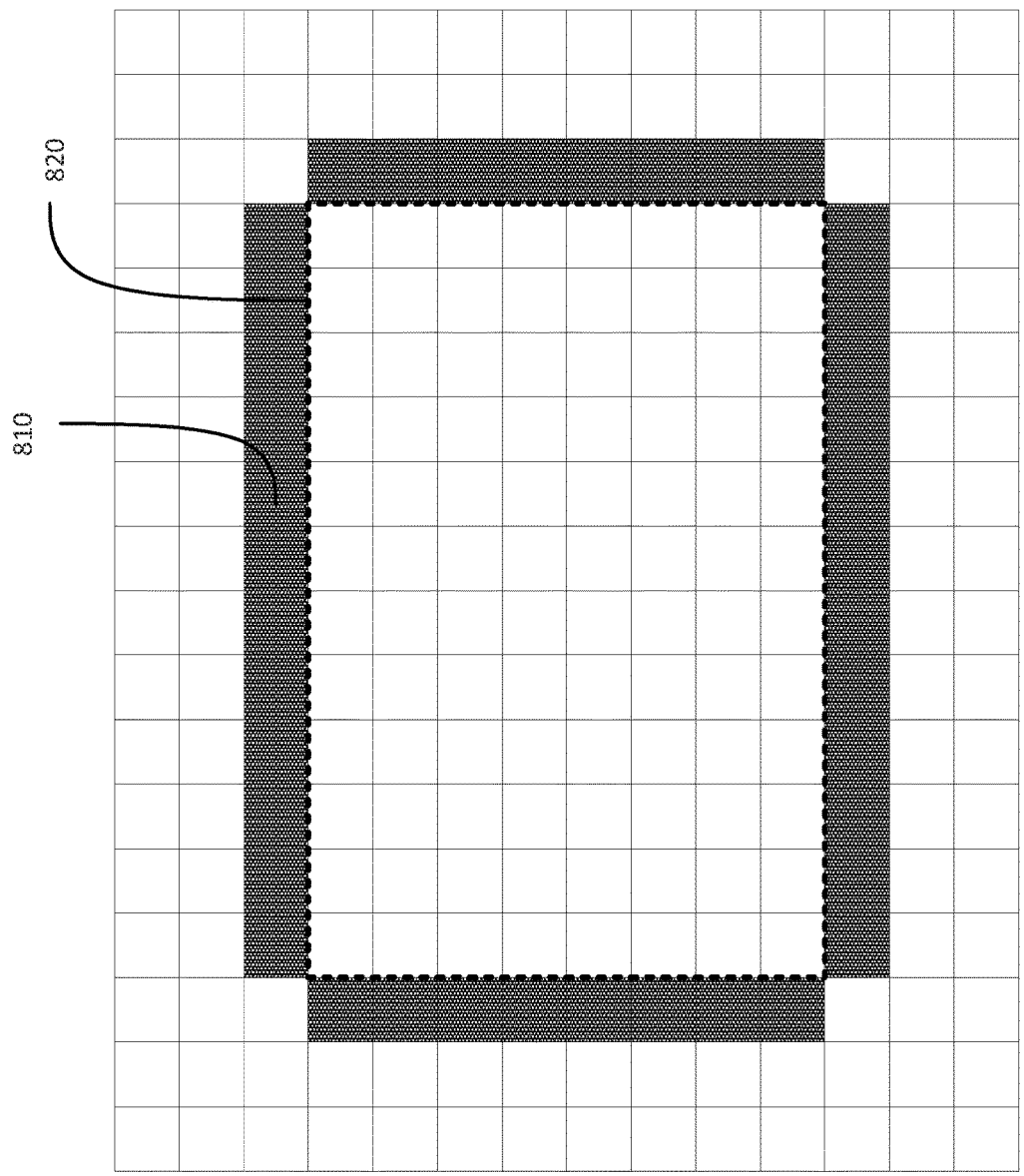
FIG. 8 illustrates an example of an outside alignment of a line relative to corner points of a pixel grid, according to certain embodiments of the present disclosure.

FIG. 8 illustrates an example of an outside alignment of a line 810 relative to corner points of a pixel grid, according to certain embodiments of the present disclosure. In an example, the corner points of the pixels to be occupied by the line 810 on the pixel grid form a perimeter 820 (shown as a dotted perimeter in FIG. 8). The stroke setting identifies that an inside edge of the line 810 should be aligned with each corner point belonging to the perimeter 820. In other words, the line 810 is bounded internally by the perimeter 820 (e.g., the line 810 is outside the perimeter 820 and its inside edge goes through the corner points that define the perimeter 820).

If the line 810 appears blurry and is set to have an outside alignment, pixel misalignment causes the blurriness and can be observed between the inside edge (e.g., the inside corns of each of the pixels that form the line 810) and the corner points of the pixel grid. In this case, the line 810 can be shifted by up to half a pixel in a particular direction based on the pixel misalignment. At the new location, the line 810 is bounded internally by the perimeter 820.

Figure 9:
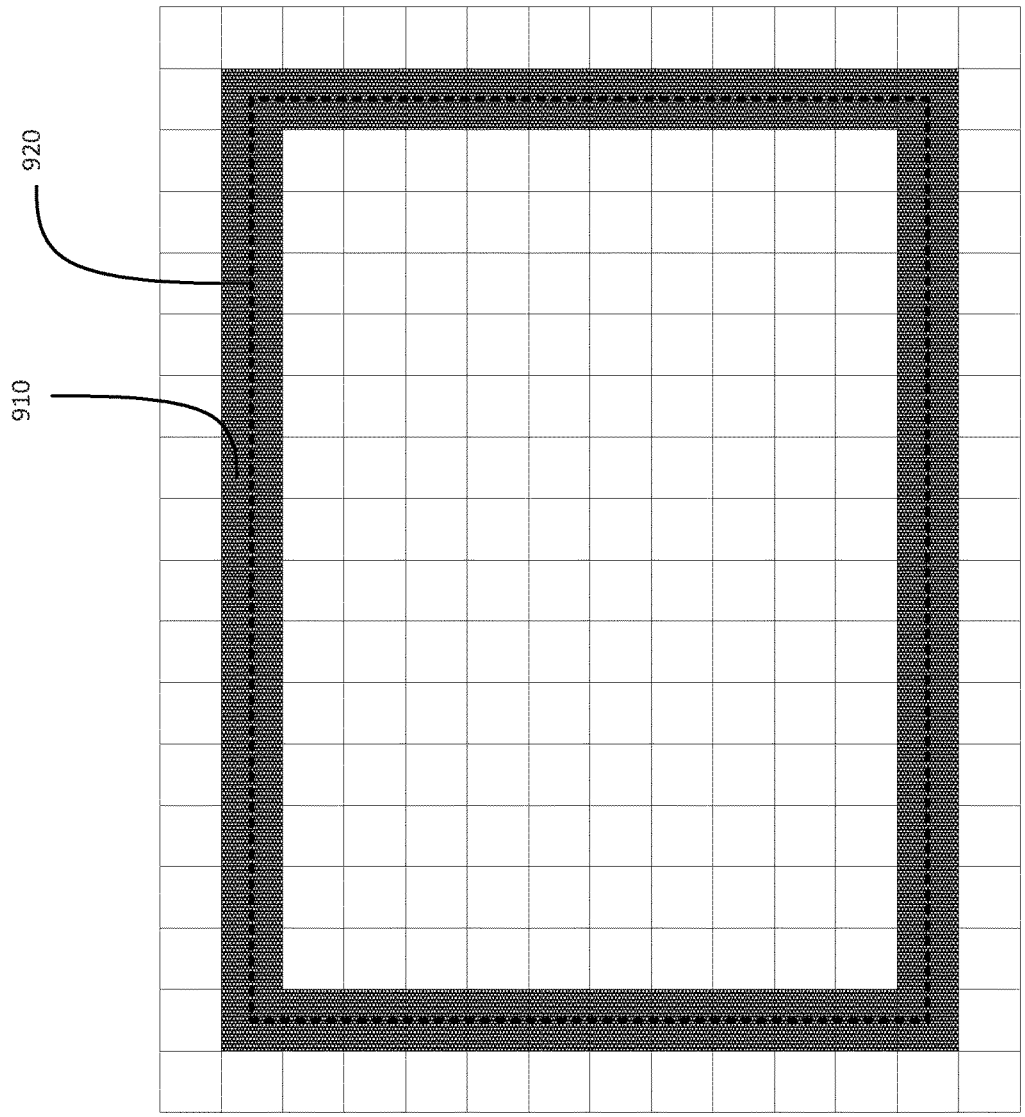
FIG. 9 illustrates an example of a center alignment of a line having an odd number of pixels relative to center points of a pixel grid, according to certain embodiments of the present disclosure.
Figure 10:
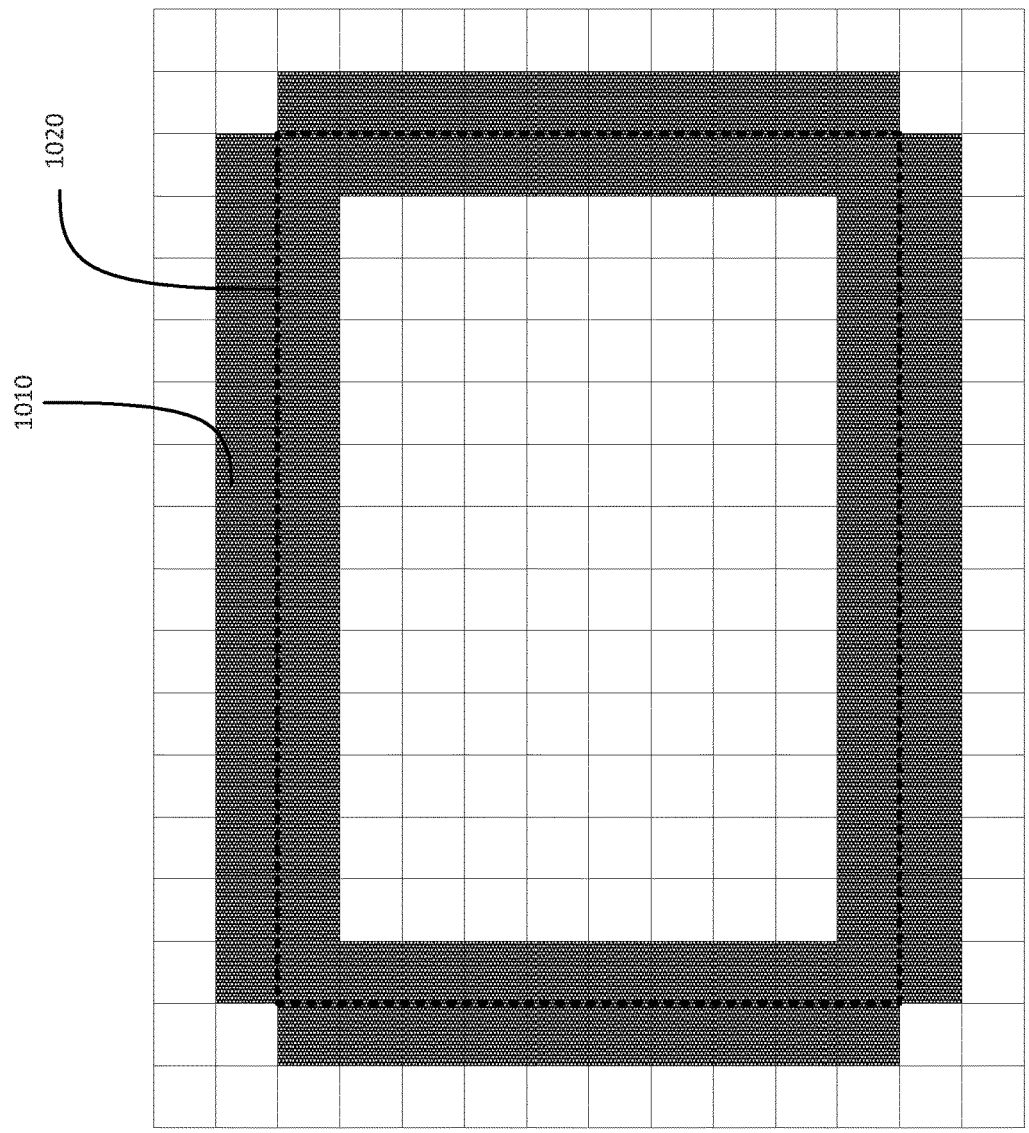
FIG. 10 illustrates an example of a center alignment of a line having an even number of pixels relative to center points of a pixel grid, according to certain embodiments of the present disclosure.

FIG. 9 illustrates an example of a center alignment of a line 910 having an odd number of pixels relative to center points of a pixel grid, according to certain embodiments of the present disclosure. Here, the number of pixels correspond to the width of the line 910, and is illustrated as one (e.g., the line 910 is one pixel wide). Of course other widths are possible. In an example, the center points of the pixels to be occupied by the line 910 on the pixel grid form an internal perimeter 920 (shown as a dotted perimeter in FIG. 9). The stroke setting identifies that a middle of the line 910 should be aligned with each center point belonging to the internal perimeter 920. In other words, the internal perimeter 920 goes through the middle of the line 910.

If the line 910 appears blurry and is set to have a center alignment, pixel misalignment causes the blurriness and can be observed between the middle of the line 910 and the center points of the internal perimeter 920. In this case, the line 910 can be shifted by up to half a pixel in a particular direction based on the pixel misalignment. At the new location, the line 910 is centered with the internal perimeter 920.

FIG. 10 illustrates an example of a center alignment of a line 1010 having an even number of pixels relative to center points of a pixel grid, according to certain embodiments of the present disclosure. Here, the number of pixels correspond to the width of the line 1010, and is illustrated as two (e.g., the line 1010 is two pixel wide). Of course other widths are possible. In an example, the corner points of the pixels to be occupied by the line 1010 on the pixel grid form an internal perimeter 1020 (shown as a dotted perimeter in FIG. 10). The stroke setting identifies that a middle of the line 1010 should be aligned with each corner point belonging to the internal perimeter 1020. In other words, the internal perimeter 1020 goes through the middle of the line 1010.

If the line 1010 appears blurry and is set to have a center alignment, pixel misalignment causes the blurriness and can be observed between the middle of the line 1010 and the corner points of the internal perimeter 1020. In this case, the line 1010 can be shifted by up to half a pixel in a particular direction based on the pixel misalignment. At the new location, the line 1010 is centered with the internal perimeter 1020.

Figure 11:
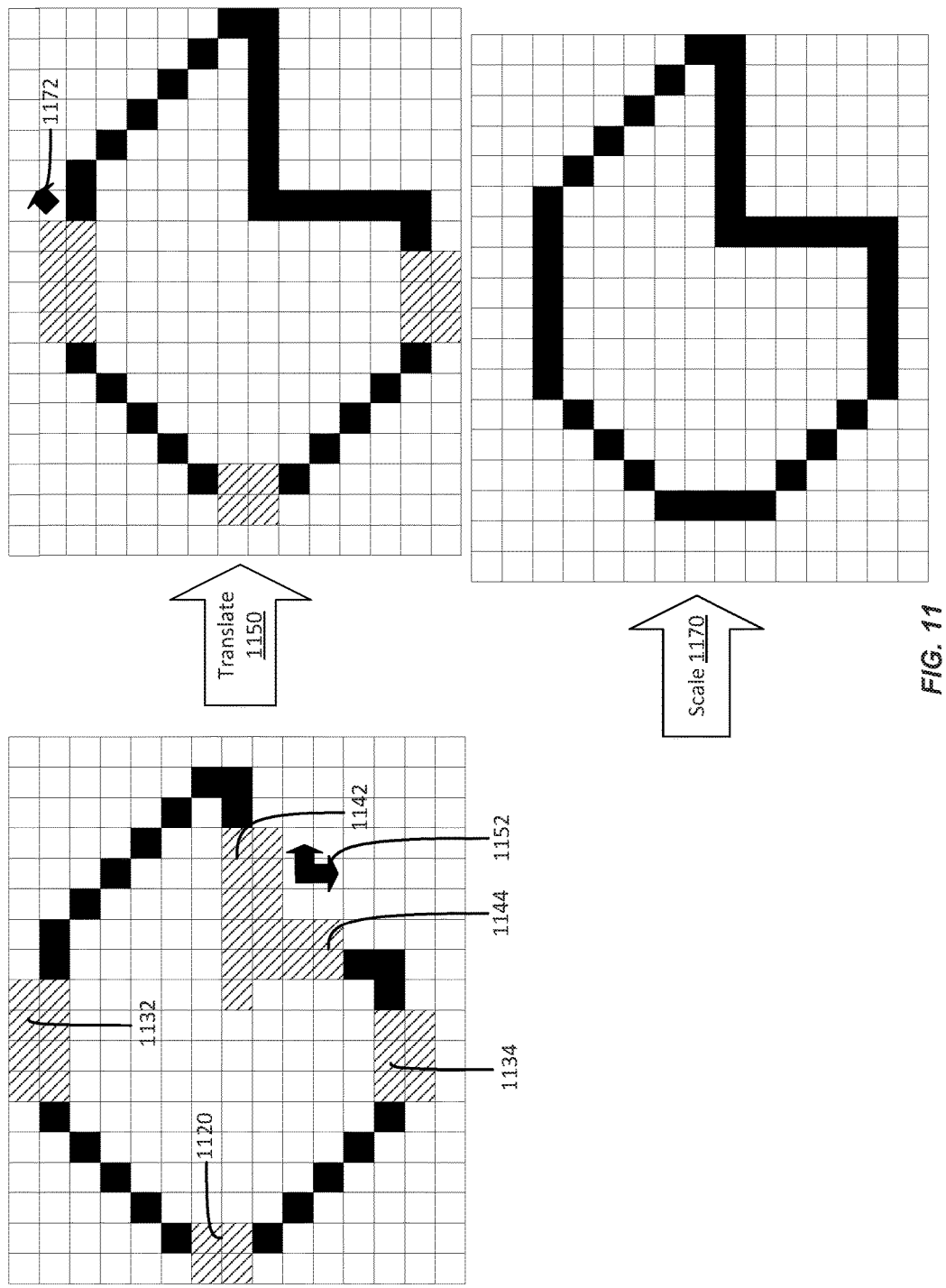
FIG. 11 illustrates an example of correcting the blurriness of a graphic object having a pie shape, according to certain embodiments of the present disclosure.

FIG. 11 illustrates an example of correcting the blurriness of a graphic object having a pie shape, according to certain embodiments of the present disclosure. Here, the pie shape is similar to the one of FIG. 5. In particular, it includes a left, vertical external line 1120, a top, horizontal external line 1132, a bottom, horizontal external line 1134, a horizontal internal line 1142, and a vertical internal line 1144 that are blurry. The bluriness is corrected in two phases based on computed offsets.

In the first phase, the blurriness of the internal lines 1142 and 1144 is corrected. In the illustrative example of FIG. 11, the internal line 1142 is a horizontal line. Its blurriness can be corrected by translating this line in the vertical direction by a particular offset. The direction and the particular offset depend on the stroke settings, including the user-defined alignment and stroke width. The translation moves the internal line 1142 up or down from its current location on the pixel grid to a new location. The translated distance corresponds to the direction and offset. The new location on the pixel grid results in proper alignment of the internal line 1142 such that its pixel distribution meets the stroke settings. For instance, if the stroke settings is for a one pixel width, a black color, and an inside alignment, the internal line 1142 at the new location will have these settings. Likewise, the internal line 1144 can be translated by an offset. Because this line 1144 is vertical, the translation is horizontal (e.g., to the left or to right).

Translating the internal lines 1142 and 1144 only can break the geometry of the pie shape. Instead, once the two offsets are determined (e.g., the offset in the vertical direction for the horizontal internal line 1142, and the offset in the horizontal direction for the vertical internal line 1144; these two offsets are illustrated with element 1152 in FIG. 11), the entire pie shape (or, equivalently, the graphic object) is translated 1150 by these two offsets. In other words, the internal line is translated not only by the vertical direction offset, but also by the horizontal direction offset, and so are the remaining lines that form the pie shape.

In the second phase, the blurriness of the external lines 1120, and 1132, and, 1134 is corrected. In an example, the blurriness of the external line 1132 can be corrected by scaling 1170 this line in a particular direction by a particular offset 1172. The particular direction and offset 1172 depend on the stroke settings, including the user-defined alignment and stroke width. The scaling 1170 resizes the external line 1132, such that one of its edges remains at the original location on the pixel grid and another edge moves to a new location. In this way, the scaled external lines 1132 occupies pixels (or portions thereof) between its first edge at the original location and its second edge at the new location. This scaling 1170 results in proper alignment of the external line 1132 such that its pixel distribution meets the stroke settings. For instance, if the stroke settings is for a one pixel width, a black color, and an inside alignment, the scaled external line 1132 will have these settings. Likewise, the external line 1120 and 1134 can each be scaled by an offset at a particular direction.

To avoid breaking the geometry of the pie shape, the scaling of the external lines 1120, 1132, and 1134 is anchored to the center of the pie shape (which can correspond to the center of the original ellipse). For instance, the external line 1134 is scaled, while keeping the center at its current location on the pixel grid. This anchored scaling also avoid introducing blurriness to the now crisp internal lines 1142 and 1144.

Figure 12:
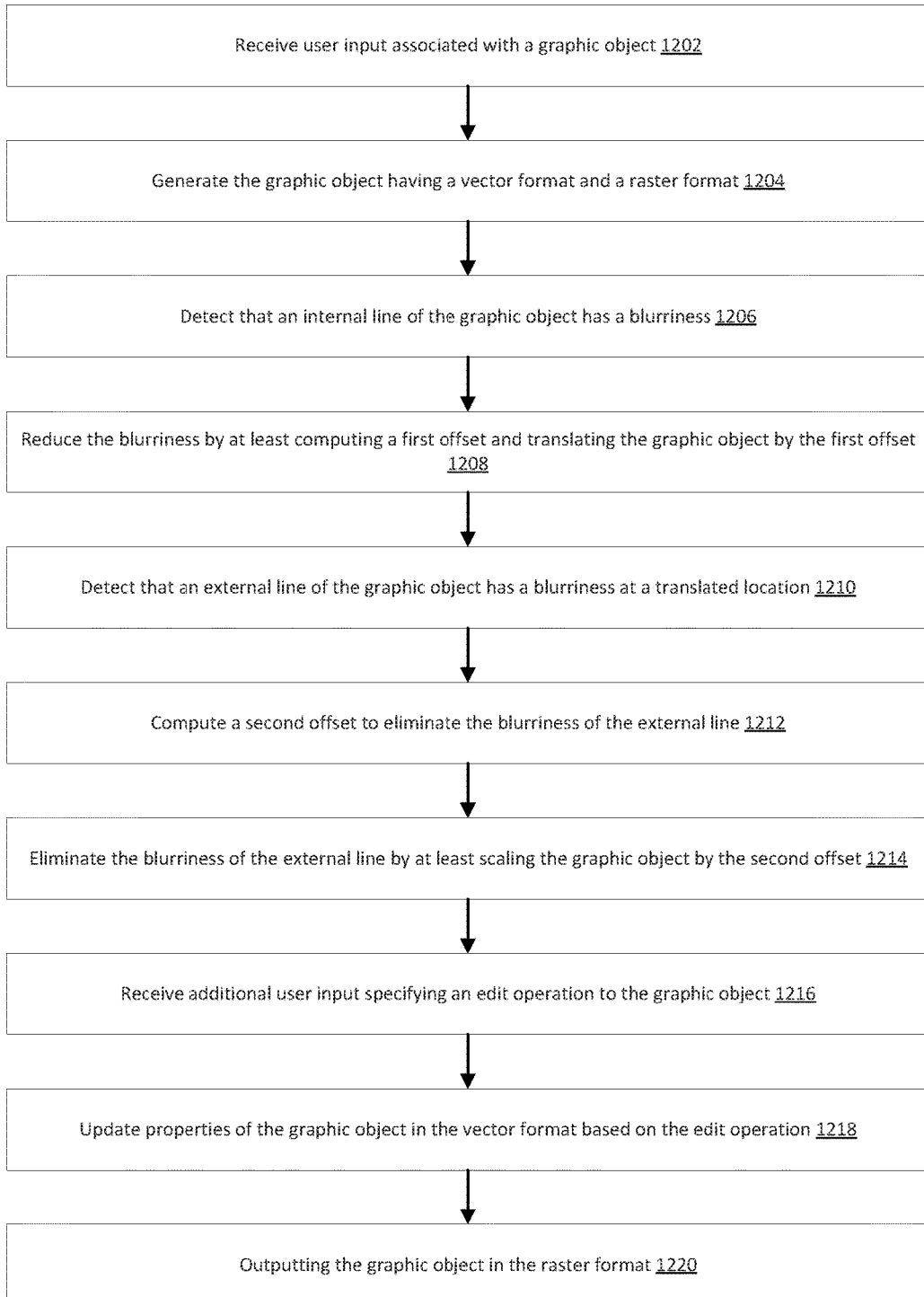
FIG. 12 illustrates an example of a flow for correcting the blurriness of a graphic object, according to certain embodiments of the present disclosure.

FIG. 12 illustrates an example of a flow for correcting the blurriness of a graphic object, according to certain embodiments of the present disclosure. A computer system hosting a graphic editing application, such as the computing device 102 hosting the graphic editing application 110 of FIG. 1, may be configured to perform the illustrative flow in some embodiments. Instructions for performing the operations of the illustrative flow can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

In the interest of clarity of explanation, the illustrative flow is described in connection with a graphic object having a pie shape. However, the illustrative flow similarly applies to other shape types and to more than one graphic object (each of which can have a different shape type). Generally, the illustrative flow can be applied to a graphic object that has lines, where these lines are defined based on a set of polygons. In the further interest of clarity of explanation, the illustrative flow is described in connection with correcting the blurriness of vertical and horizontal lines of the graphic object's shape. However, the illustrative flow similarly applies to lines having other orientations. Generally, the illustrative flow can be applied to perform translations and scaling based on offsets, where the offsets result in proper alignments of the lines on the grids given their stroke settings.

The illustrative flow starts at operation 1202, where the computer system receives user input associated with a graphic object. In an example, the user input is received at a user interface of the graphic editing application and defines an initial shape of the graphic object, such as an ellipse shape. The ellipse is represented in a vector format and a bounding box is defined around the ellipse shape in the vector format. Based on the bounding box and the definition of the ellipse in the vector format (e.g., as a set of polygons), a property editor is presented at the user interface and allows the user to replace portions of the ellipse with internal lines. Further the property editor, or some other menu option of the user interface, allows the user to set the stroke settings of the ellipse shape and/or the internal lines (or, equivalently, the pie shape).

At operation 1204, the computer system generates the graphic object having the vector format and a raster format. In an example, upon receiving the user input via the user interface (e.g., at the property editor), the computer system removes the portions of the ellipse shape and adds the internal lines to the graphic object (e.g., by removing a subset of the polygons corresponding to the portions and adding a new set of polygons corresponding to the internal lines in the vector format), thereby generating a live pie shape. The graphic editing application also supports the raster format and can present the pie shape on a pixel grid according to the raster format. In an example, the graphic editing application generates the graphic object in the vector format, and a version of the graphic object in the raster format is generated on demand. For instance, upon user input requesting a raster preview or an export of the graphic object in the raster format, the graphic editing application generates the raster format version of the graphic object.

At operation 1206, the computer system detects that an internal line of the graphic object has a blurriness when rendered in the raster format. In an example, the computer system identifies the internal lines that are vertical or horizontal based on their geometric definition in the vector format. For each of these internal lines, the computer system detects the blurriness by assessing the pixel distribution of the internal line according to its stroke settings. For instance, the raster format identifies a first location of an internal line on the pixel grid. At that location, the internal line has a first pixel distribution. If that pixel distribution does not meet the stroke settings, the computer system determines that the internal line is blurry at the first location. To illustrate, if the stroke settings are for a one pixel wide internal line and the pixel distribution indicates that the width at the first location on the pixel grid is two pixels (or some other number different than one), the computer system declares blurriness.

At operation 1208, the computer system reduces (e.g., eliminates or minimizes) the blurriness of each internal line (if blurry) by at least computing a first offset for the internal line and translating the graphic object by the first offset. In an example, the entire graphic object moves by the first offset. For example, if the offset of an internal vertical line is half a pixel to the right, all the lines and the center of the graphic object are translated by half a pixel to the right. In this way, the pie shape geometry, as defined in the vector format, is not broken and the liveness of the pie shape is not lost.

In an example, computing the first offset for an internal line is based on the first location of that internal line on the pixel grid (e.g., its original or current location) and a second location on the pixel grid to which the internal line would be translated. The second location is the nearest to the first location (e.g., the offset is the smallest) and corresponds to (e.g., when the translation is performed, would result in) a pixel distribution that meets the stroke settings of the internal line. In other words, when the internal line is at the second location, the internal line would not have any blurriness because the stroke settings would be met at that location. This second location can be referred to as the nearest pixel-perfect-location. Generally, to keep this second location as the nearest location, the offset is bounded to a range of zero to a half pixel. Further, the specific value of the first offset depends on the alignment and width settings and can be derived from a table that specify rules for translating the internal line.

To illustrate, the internal line is a vertical line. Its stroke settings specify a width of one pixel and an inside alignment. In comparison, the pixel distribution at the first location shows a width of two pixels. Accordingly, the computer system determines that at half a pixel to the right of the first location, the internal line would have a one pixel width. Hence, the computer system sets the offset to half a pixel to the right. This new location corresponds to the second location. The computer aligns the line at the new location according to the stroke setting (e.g., the inside alignment).

The operations 1206 and 1028 are repeated across the internal lines that are blurry. Accordingly, the computer system may translate the graphic object by multiple offsets in multiple directions. Nonetheless, the translations do not break the geometry of the pie shape.

At operation 1210, the computer system detects that an external line of the graphic object has a blurriness at a translated location. This operation is similar to operation 1206, where the detection is performed for the external line once the graphic object has been translated per the offset(s) derived and used under operations 1206 and 1208.

At operation 1212, the computer system computes a second offset to eliminate the blurriness of the external line. In an example, this second offset is between the external line at the translated location and a third location on the pixel grid. The second offset is computed based on the blurriness of the external line at the translated location as detected under operation 1210. The third location is the nearest pixel-perfect location relative to the translated location of the external line. The detection is similar to operation 1208 with two exceptions and is performed for the external line once the graphic object has been translated.

The first exception relates to scaling. In the case of the translation, the offset is in the horizontal direction for an internal vertical line and in the vertical direction for an internal horizontal line. However, in the case of scaling, no such constraint exists. The offset can be in the vertical direction, diagonal direction, or horizontal direction for an external line. In other words, the third location (the nearest-pixel-perfect location) can be in any direction relative to the translated location.

The second location relates to limiting the scaling. In the case of the translation, each offset is individually bounded to a range of zero to half a pixel. However, in the case of scaling, two ranges are used: an individual range and a collective range. The individual range limits an individual offset to an amount between zero and a half a pixel. The collective range limits a collective offset to an amount between zero and one pixel. More specifically, the individual range represents the range by which an external line (and, equivalently, the entire graphic object) can be scaled to correct the external line's blurriness. However, in certain situations, scaling the graphic object based on one offset to correct the blurriness of one external line and then by another offset to correct the blurriness of another external line can result in a too large scaling noticeable to an end user. To avoid such scenarios, the collective range is used. Similarly, a uniform scaling around a center of the graphic object typically moves two opposite lines by the same amount in opposite direction. The total amount represents the collective scaling of these two lines and should be limited to a value within the collective range.

More specifically, the collective range is applicable when two external lines should be scaled and are opposite of each other in the graphic object (such as the top, horizontal external line 1132 and the bottom, horizontal external line 1134 of FIG. 11). In this case, an offset is computed for each of these external lines. If the combination of the offset falls outside the collective range, the direction of one offset is flipped (e.g., by reversing its direction).

To illustrate, assume that a top, horizontal external line should be scaled upward in the vertical direction by half a pixel and that a bottom, horizontal external line should be scaled downward in the vertical direction by half a pixel. This would result in scaling the graphic object by a full pixel in the vertical direction. Because, the one pixel scaling falls outside the collective range, the offset of the bottom line is flipped from half a pixel in the downward direction to a half a pixel in the upward direction. In this way, the graphic object would be scaled in half a pixel, which is within the collective range.

At operation 1214, the computer system eliminates the blurriness of the external line by at least scaling the graphic object by the second offset. In an example, the scaling keeps the center of the graphic object fixed (e.g., at its current translated location from operation 1208) and is symmetrical about the horizontal and vertical axes. The scaling includes sizing up or down the external line by the second offset, where this sizing is applied to the external line in the vector format (e.g., applies to the set of polygons that define the external line). This type of scaling (anchoring the center) does not cause loss of the liveness of the pie shape because of the symmetrical scaling about the horizontal and vertical axes.

In an example, the scaling is uniform in a desired direction (e.g., horizontal, vertical, or both) and about the center of the graphic object. In other words, in any direction, only one scaling is applied. For instance, only one scaling is applied to the external top and bottom horizontal lines and moves these lines vertically about the center. Continuing with this illustration, because the scaling is uniform to maintain geometry, the two external horizontal lines will move vertically by the same amount but in opposite directions from each other. The collective range is applied such that the total amount of the vertical movement of these two external horizontal lines is less than one pixel in the vertical direction.

At operation 1216, the computer system receives additional user input specifying an edit operation to the graphic object. For example, after the graphic object has been scaled, the additional user input is received and can edit any property of the pie shape (including changing the internal lines, resizing, changing the shape back to an ellipse, editing the stroke settings, etc.). The edits are based on the liveness of the pie shape, where available edit operations can be presented in a property editor.

At operation 1218, the computer system updates properties of the graphic object in the vector format based on the edit operation. For example, the values of these properties are modified in the vector format based on the additional user input.

At operation 1220, the computer system outputs the graphic object. In an example, the graphic object is outputted in a raster format and, optionally, in the vector format. Outputting the graphic object includes storing this object in a file with the proper extension. The file can be stored locally on the computer system or transmitted over a data network for remote storage at a computing resource.

Figure 13:
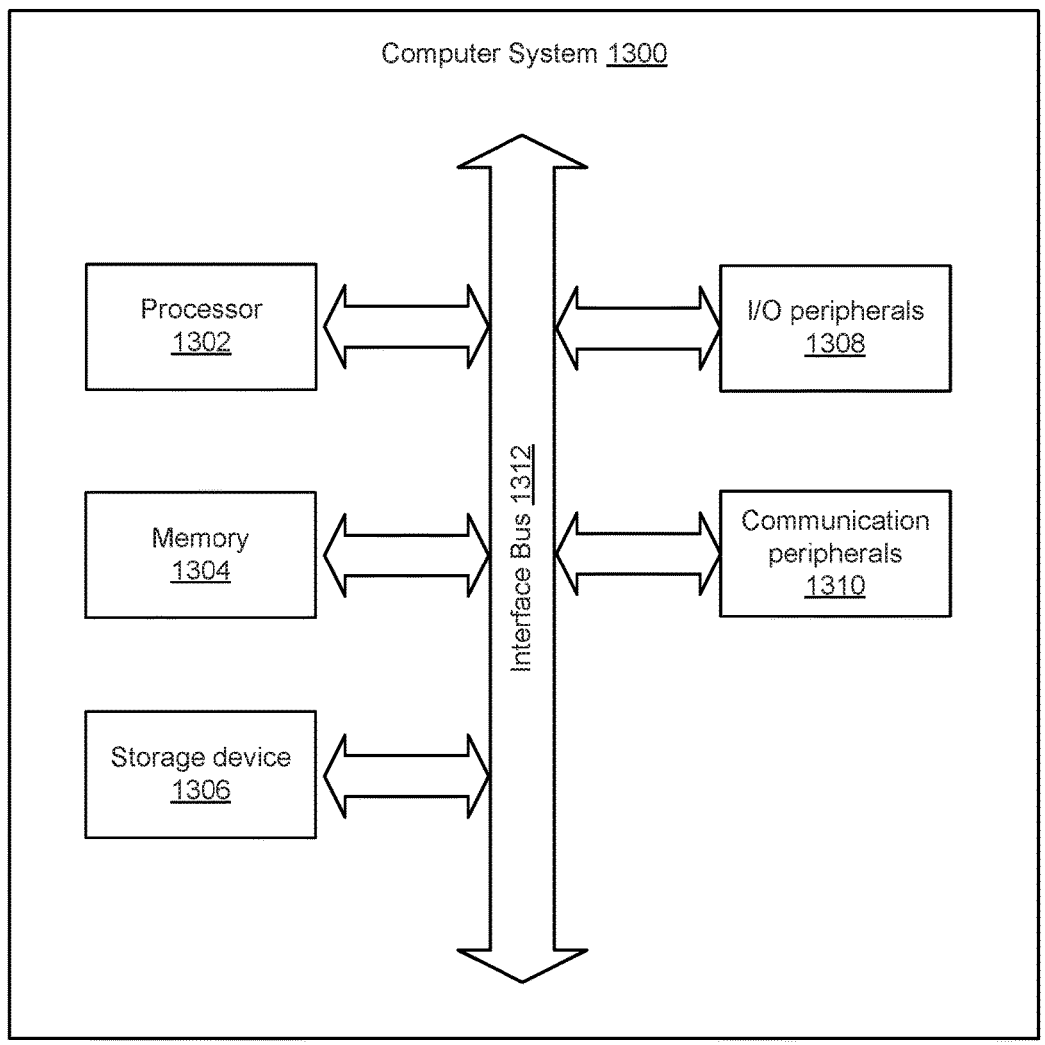
FIG. 13 illustrates examples of components of a computer system, according to certain embodiments of the present disclosure.

FIG. 13 illustrates examples of components of a computer system 1300, according to certain embodiments of the present disclosure. The computer system 1300 includes at least a processor 1302, a memory 1304, a storage device 1306, input/output peripherals (I/O) 1308, communication peripherals 1310, and an interface bus 1312. The interface bus 1312 is configured to communicate, transmit, and transfer data, controls, and commands among the various components of the computer system 1300. The memory 1304 and the storage device 1306 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1304 and the storage device 1306 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1300.

Further, the memory 1304 includes an operating system, programs, and applications. The processor 1302 is configured to execute the stored instructions and includes, for example, a logical processing unit, a microprocessor, a digital signal processor, and other processors. The memory 1304 and/or the processor 1302 can be virtualized and can be hosted within another computing system of, for example, a cloud network or a data center. The I/O peripherals 1308 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1308 are connected to the processor 1302 through any of the ports coupled to the interface bus 1312. The communication peripherals 1310 are configured to facilitate communication between the computer system 1300 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense)

so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method, comprising:
   generating, by a graphic editing application hosted on a computing device, a graphic object, wherein the graphic editing application defines a vector format and a raster format for the graphic object;
   detecting, by the graphic editing application, that an internal line of the graphic object has a blurriness when rendered in the raster format, wherein the raster format identifies a first location of the internal line on a pixel grid, and wherein the blurriness is associated with a first pixel distribution of the internal line at the first location on the pixel grid;
   reducing, by the graphic editing application, the blurriness of the internal line by at least:
      computing a first offset between the first location and a second location on the pixel grid, wherein the second location corresponds to a second pixel distribution of the internal line on the pixel grid, and
      translating the graphic object on the pixel grid by the first offset;
   computing, by the graphic editing application, a second offset between an external line of the graphic object at a translated location and a third location on the pixel grid, wherein the second offset is computed based on a blurriness of the external line; and
   scaling, by the graphic editing application, the graphic object by the second offset based on the vector format.

2. The computer-implemented method of claim 1, wherein the graphic editing application is configured to generate menu icons, and further comprising: after scaling the graphic object, outputting the graphic object in the raster format as a menu icon.

3. The computer-implemented method of claim 1, wherein the graphic object has a pie shape, wherein generating the graphic object comprises:
   defining an ellipse shape and a bounding box around the ellipse shape in the vector format; and
   adding internal lines to the ellipse shape while maintaining the bounding box in the vector format, wherein the internal line is a vertical line or a horizontal line of the pie shape, and wherein the external line is a vertical line or a horizontal line of the ellipse shape.

4. The computer-implemented method of claim 3, wherein the graphic object is generated based on user input, and further comprising:
   receiving, by the graphic editing application after scaling the graphic object, additional user input specifying an edit operation;
   updating, by the graphic editing application, properties of the graphic object in the vector format based on the edit operation.

5. The computer-implemented method of claim 1, wherein the blurriness of the internal line is detected based on stroke settings of the internal line, wherein the stroke settings comprise an alignment and a width of the internal line.

6. The computer-implemented method of claim 5, wherein the alignment is associated with coordinate points on the pixel grid, and wherein the blurriness is detected based on a misalignment between the first pixel distribution of the internal line at the first location and the coordinate points on the pixel grid.

7. The computer-implemented method of claim 5, wherein the width is associated with a number of pixels to be occupied by the internal line on the pixel grid, and wherein the blurriness is detected based on a determination that the first pixel distribution of the internal line at the first location occupies a different number of pixels on the pixel grid.

8. The computer-implemented method of claim 1, wherein the first offset between the first location and the second location on the pixel grid is computed based on a determination according to a stroke setting of the internal line that pixels of the internal line are misaligned at the first location and become aligned at the second location.

9. The computer-implemented method of claim 8, wherein the stroke setting identifies a width of a line and that an outside edge of the internal line should be aligned with a corner point, wherein the first offset is set to a value up to half a pixel in a particular direction based on misalignment between the outside edge of the internal line at the first location and the corner point of the pixel, and wherein, upon the translating of the graphic object to the second location, the internal line has the width and the outside edge is aligned with the corner point.

10. The computer-implemented method of claim 8, wherein the stroke setting identifies that an inside edge of the internal line should be aligned with a corner point, wherein the first offset is set to a value up to half a pixel in a particular direction based on misalignment between the inside edge of the internal line at the first location and the corner point of the pixel, and wherein, upon the translating of the graphic object to the second location, the inside edge is aligned with the corner point.

11. The computer-implemented method of claim 8, wherein the stroke setting identifies that a middle of the internal line should be aligned with a corner point when a width of the internal line is an even number of pixels, wherein the first offset is set to a value up to half a pixel in a particular direction based on misalignment between the middle of the internal line and the corner point of the pixel, and wherein, upon the translating of the graphic object to the second location, the middle of the internal line is aligned with the corner point.

12. The computer-implemented method of claim 8, wherein the stroke setting identifies that a middle of the internal line should be aligned with a center point when a width of the internal line is an odd number of pixels, and wherein the first offset is set to a value up to half a pixel in a particular direction based on misalignment between the middle of the internal line and the center point of the pixel, and wherein, upon the translating of the graphic object to the second location, the middle of the internal line is aligned with the center point.

13. The computer-implemented method of claim 8, wherein the graphic editing application computes the first offset based on accessing a table local to the graphic editing application, wherein the table identifies rules for computing offsets based on a width of a line and for aligning the line based on an inside alignment, an outside alignment, a center alignment with an even number of pixels, and a center alignment with an odd number of pixels of the graphic object.

14. The computer-implemented method of claim 13, wherein the second offset between the external line of the graphic object at the translated location and the third location on the pixel grid is computed based on the rules in the table.

15. The computer-implemented method of claim 1, wherein computing the second offset between the external line of the graphic object at the translated location and the third location on the pixel grid comprises:
   computing a third offset for a second external line of the graphic object, wherein the external line and the second external line are on opposite sides of the graphic object;
   determining that a combination of the second offset and the third offset is larger than one pixel; and
   reversing a direction of the second offset based on the combination being larger than one pixel.

16. A computer system, comprising:
   means for generating a graphic object, wherein the graphic object has a vector format and a raster format;
   means for detecting that an internal line of the graphic object has a blurriness when rendered in the raster format, wherein the raster format identifies a first location of the internal line on a pixel grid, and wherein the blurriness is associated with a first pixel distribution of the internal line at the first location on the pixel grid;
   means for reducing the blurriness of the internal line by at least:
      computing a first offset between the first location and a second location on the pixel grid, wherein the second location corresponds to a second pixel distribution of the internal line on the pixel grid, and
      translating the graphic object on the pixel grid by the first offset;
   means for computing a second offset between an external line of the graphic object at a translated location and a third location on the pixel grid, wherein the second offset is computed based on a blurriness of the external line; and
   means for scaling the graphic object by the second offset based on the vector format.

17. The computer system of claim 16, wherein the first offset between the first location and the second location on the pixel grid is computed based on a stroke setting that identifies a width of the internal line, wherein the second pixel distribution of the internal line at the second location indicates that the stroke setting is met.

18. The computer system of claim 17, wherein, upon translating the internal line to the second location, the internal line is aligned with the pixel grid based on rules specifying, relative to corner points and center points of the pixel grid, an inside alignment, an outside alignment, a center alignment with an even number of pixels, and a center alignment with an odd number of pixels of the internal line.

19. A non-transitory computer-readable storage medium storing computer-readable instructions that, upon execution on a computer system, cause the computer system to perform operations comprising:
   generating a graphic object that has a vector format and a raster format;
   detecting that an internal line of the graphic object has a blurriness when rendered in the raster format, wherein the raster format identifies a first location of the internal line on a pixel grid, and wherein the blurriness is associated with a first pixel distribution of the internal line at the first location on the pixel grid;
   reducing the blurriness of the internal line by at least:
      computing a first offset between the first location and a second location on the pixel grid, wherein the second location corresponds to a second pixel distribution of the internal line on the pixel grid, and
      translating the graphic object on the pixel grid by the first offset;
   computing a second offset between an external line of the graphic object at a translated location and a third location on the pixel grid, wherein the second offset is computed based on a blurriness of the external line; and
   scaling the graphic object by the second offset based on the vector format.

20. The non-transitory computer-readable storage medium of claim 19, wherein computing the second offset between the external line of the graphic object at the translated location and the third location on the pixel grid comprises:
   computing a third offset for a second external line of the graphic object, wherein the external line and the second external line are on opposite sides of the graphic object;
   determining that a combination of the second offset and the third offset is larger than one pixel; and
   reversing a direction of the second offset based on the combination being larger than one pixel.

\* \* \* \* \*